United States Patent
Kroening et al.

(10) Patent No.: US 6,735,757 B1
(45) Date of Patent: May 11, 2004

(54) APPARATUS AND METHOD FOR CHECKING COMPONENT COMPATIBILITY IN A BUILD TO ORDER COMPUTER SYSTEM

(75) Inventors: James L. Kroening, Dakota Dunes, SD (US); Frank W. O'Neal, IV, McCook Lake, SD (US)

(73) Assignee: Gateway, Inc., Poway, CA (US)

( * ) Notice: Subject to any disclaimer, the term of this patent is extended or adjusted under 35 U.S.C. 154(b) by 458 days.

(21) Appl. No.: 09/735,152

(22) Filed: Dec. 12, 2000

Related U.S. Application Data

(63) Continuation of application No. 09/630,404, filed on Aug. 2, 2000, which is a continuation-in-part of application No. 09/562,870, filed on May 1, 2000, now abandoned, which is a continuation-in-part of application No. PCT/US99/08095, filed on Apr. 13, 1999, which is a continuation-in-part of application No. 09/090,118, filed on Jun. 4, 1998, now Pat. No. 6,080,207.

(51) Int. Cl.[7] .............................................. G06F 9/44
(52) U.S. Cl. ...................... 717/120; 717/121; 717/170
(58) Field of Search ................................ 717/175, 178, 717/100, 120, 170, 121, 122, 101, 168; 345/721; 361/692, 702, 756, 759; 700/95, 83, 79, 242, 241, 117, 116, 114, 112; 707/203

(56) References Cited

U.S. PATENT DOCUMENTS

| | | | | |
|---|---|---|---|---|
| 5,247,683 A | * | 9/1993 | Holmes et al. | 709/221 |
| 5,428,791 A | | 6/1995 | Andrew et al. | 717/121 |
| 5,659,735 A | | 8/1997 | Parrish et al. | 707/10 |
| 5,758,160 A | * | 5/1998 | McInerney et al. | 717/104 |
| 5,805,891 A | | 9/1998 | Bizuneh et al. | 717/121 |
| 5,835,777 A | * | 11/1998 | Staelin | 717/175 |
| 5,872,957 A | * | 2/1999 | Worthington et al. | 703/13 |
| 5,872,958 A | * | 2/1999 | Worthington et al. | 703/13 |

(List continued on next page.)

OTHER PUBLICATIONS

Dart S., "Concepts in Configuration Management Systems", Proceedings of the 3rd International Workshop on Software Configuration Management, pp. 1–18, 1991.*

Mori et al., "A Computer Hardware Configuration Expert System: Examination of Its Software Reliability", Proceedings of the 9t Conference on Artificial Intelligence for Applications, pp. 306–311, Mar. 1993.*

Iizuka et al., "A Computer System configuration Design Expert System: IDEA/C", International Workshop on Artificial Intelligenc for Industrial Applications 1988, pp. 442–447, May 1988.*

Kramer, B.M., "Knowledge–based Configuraion of Computer Systems Using Hierarchical Partial Choice", 3rd International Conference on Tools for Artificial Intelligence, pp. 368–375, Nov. 1991.*

Lee et al., "Integrated Configuration Management System (ICMS) for Computer System Development", Portland International Conference Management and Technology, pp. 472–475, Jul. 1997.*

(List continued on next page.)

Primary Examiner—Wilbert L. Starks, Jr.
Assistant Examiner—Kevin Booker
(74) Attorney, Agent, or Firm—Scott Charles Richardson; Chad W. Swantz; Suiter-West

(57) ABSTRACT

The present invention discloses an apparatus and method for checking component compatibility during the manufacture and installation of a build to order computer system. When components are selected to manufacture the computer, each component may be included in a database that may indicate the revision number of the component and whether the component has any compatibility conflicts with other components. The system may select the latest revision of a component that does not have compatibility conflicts with other components utilized in the computer system. Further, the apparatus and method of the present invention may check new revisions of a component to verify whether a compatibility conflict present in earlier revisions still exists and may update the database when additional compatibility conflicts are identified.

19 Claims, 4 Drawing Sheets

U.S. PATENT DOCUMENTS

| | | | | |
|---|---|---|---|---|
| 5,881,270 | A | * | 3/1999 | Worthington et al. .......... 703/21 |
| 5,894,571 | A | | 4/1999 | O'Connor ....................... 713/2 |
| 5,956,479 | A | * | 9/1999 | McInerney et al. ............ 714/38 |
| 5,956,513 | A | | 9/1999 | McLain, Jr. ................. 717/142 |
| 5,963,743 | A | | 10/1999 | Amberg et al. ............. 717/174 |
| 5,991,543 | A | | 11/1999 | Amberg et al. ............. 717/175 |
| 5,995,757 | A | | 11/1999 | Amberg et al. ............. 717/175 |
| 6,002,854 | A | | 12/1999 | Lynch et al. .................... 703/1 |
| 6,009,274 | A | * | 12/1999 | Fletcher et al. ............. 717/173 |
| 6,038,399 | A | * | 3/2000 | Fisher et al. ................ 717/178 |
| 6,073,113 | A | | 6/2000 | Guinan ......................... 705/26 |
| 6,080,207 | A | | 6/2000 | Kroening et al. ........... 717/172 |
| 6,182,275 | B1 | * | 1/2001 | Beelitz et al. ............... 717/175 |
| 6,195,795 | B1 | | 2/2001 | Block et al. ................. 717/101 |
| 6,202,070 | B1 | * | 3/2001 | Nguyen et al. ........... 707/104.1 |
| 6,205,527 | B1 | | 3/2001 | Goshey et al. .............. 711/162 |
| 6,236,901 | B1 | * | 5/2001 | Goss ........................... 700/95 |
| 6,256,773 | B1 | | 7/2001 | Bowman-Amuah ......... 717/121 |
| 6,367,077 | B1 | * | 4/2002 | Brodersen et al. .......... 717/170 |
| 6,539,539 | B1 | | 3/2003 | Larsen et al. ............... 717/124 |
| 6,543,047 | B1 | | 4/2003 | Vrhel et al. ................. 717/121 |
| 2001/0044935 | A1 | | 11/2001 | Kitayama ................... 717/170 |
| 2002/0040469 | A1 | | 4/2002 | Pramberger ................. 717/121 |

OTHER PUBLICATIONS

Lange et al., "Software Architecture Analysis: A Case Study", Proceedings of the 3rd International Workshop on Software Configuration Management, pp. 19–28, 1991.*

Gomaa et al., "A Software Engineering Environment for Configuring Distributed Applications for Reusable Software Architectures", 8th International Workshop on Software Technology and Engineering Practice, Jul. 1997, pp. 312–325.

Gomaa et al., "Automated Configuration and Distributed Applications from Reusable Software Architectures", Nov. 1997, 12th IEEE INternational Conference on Automated Software Engineering pp. 193–200.

Gomaa et al., "Methods and Tools for the Automated Configuration of Distributed Applications From Reusable Software Architectures and Components", IEE Procedings–Software, Dec. 1999, vol. 146, Iss 6, pp. 277–290.

Hayes–Roth et al., "A Domain–Specific Software Architecture for Adaptive Intelligent Systems", IEEE Transactions on Software Engineering, Apr. 1995, vol. 21, No. 4, pp. 288–301.

Status Checking of System Behaviors Using Derived Component Assumptions; Paola Inverardi, Alexander L. Wolf and Daniel Yankelevich; ACM Transactions on Software Engineering and Methodology, vol. 9, No. 3, Jul. 2000.

* cited by examiner

APPARATUS AND METHOD FOR CHECKING COMPONENT COMPATIBILITY IN A BUILD TO ORDER COMPUTER SYSTEM

CROSS REFERENCE TO RELATED APPLICATION

The present application is a Continuation of U.S. patent application Ser. No. 09/630,404 filed Aug. 2, 2000, pending. Said U.S. patent application Ser. No. 09/630,404 is a Continuation-In-Part of U.S. patent application Ser. No. 09/562,870 filed May 1, 2000 (now abandoned), which is a Continuation of U.S. patent application Ser. No. 09/090,118 filed Jun. 4, 1998, now U.S. Pat. No. 6,080,207 issued Jun. 27, 2000.

Said U.S. patent application Ser. No. 09/630,404 is also a Continuation-In-Part of International Patent Application Ser. No. PCT/US99/08095, international filing date Apr. 13, 1999, pending. Said U.S. patent application Ser. No. 09/630, 404, said U.S. patent application Ser. No. 09/090,118, Patent Cooperation Treaty Application PCT/US99/08095 and U.S. patent application Ser. No. 09/562,870 are herein incorporated by reference in their entirety. The following patent applications are also incorporated by reference in their entirety:

| Attorney Docket No. | Filing Date | Serial Number |
| --- | --- | --- |
| GW 97-0506A | Aug. 2, 2000 | 09/631,641 |
| GW 97-0506B | Aug. 2, 2000 | 09/631,088 |
| GW 97-0506D1 | Aug. 2, 2000 | 09/631,081 |
| GW 97-0506D4 | Aug. 2, 2000 | 09/631,085 |

FIELD OF THE INVENTION

The present invention relates generally to the installation and manufacture of computer systems and more specifically to an apparatus and method for checking component compatibility in a build to order computer system.

BACKGROUND OF THE INVENTION

Systems and methods for efficient manufacture and installation of build to order computer systems are known to the art. For example, it is known to the art to install software and perform tests on the computer systems prior to shipping the computer system to a customer. This may result in a computer system that operates correctly and is free of malfunctioning components. Further, it is known to the art to utilize systems comprising a database that may maintain a list of the available components and required testing procedures for the associated components that may be performed during installation to more efficiently produce build to order computer systems.

Upon a customer making an order, systems known to the art may analyze the database comprising the list of available components and prescribe testing for the components necessary in the installation of the computer system. However, some components and versions of components do not operate correctly when matched with other components. For example, a component may not be compatible with another component resulting in a malfunctioning computer system. Computer manufacturing systems known to the art are limited in that they do not analyze and prevent the installation of components and versions of components that may have compatibility conflicts with other components included within the build to order computer system.

If each component listed within the component table could come equipped with a version/revision identification and a compatibility property, then a build to order computer system could be manufactured with the latest version of components available while ensuring that no compatibility conflicts were present among the components of the computer system. As such, this may result in a computer system capable of more efficient installation of a custom software configuration. Consequently, it would be advantageous if an apparatus and method existed that could be used to check component compatibility and may find a specific revision of a software component to install that may be compatible with the other software components. Further, it would be advantageous if the apparatus may update the compatibility of components when conflicts are identified. It would also be advantageous if new versions of software components could be targeted for testing to determine if a conflict that existed in the previous version still exists in the new version.

SUMMARY OF THE INVENTION

Accordingly, the present invention is directed to an apparatus and method for installing a custom software configuration on a build to order computer system capable of checking component compatibility. The apparatus may comprise a database that includes a list of components and a list of install/test steps. Each component may be identified specifically, by its class, by the version/revision number, and may also include a compatibility property. The apparatus of the present invention may be capable of updating the compatibility property of each component when new conflicts are identified. Further, the apparatus may specifically target testing of new versions of components that had a compatibility conflict in a previous version.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made to a presently preferred embodiment of the invention, an example of which is illustrated in the accompanying drawings.

Figure 1:
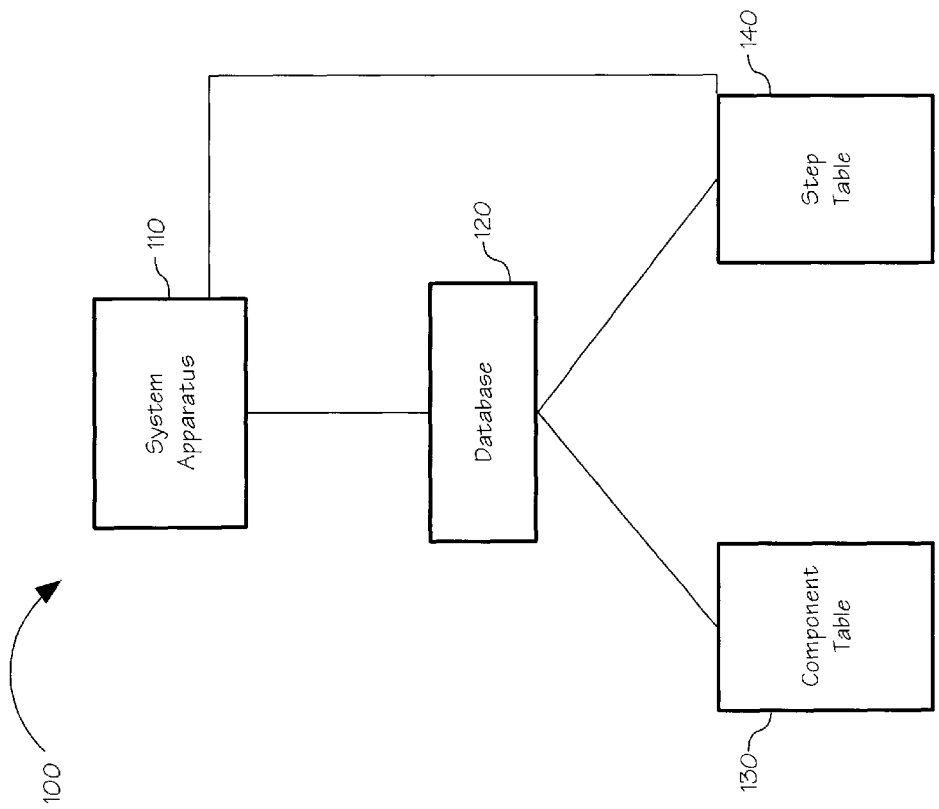
FIG. 1 depicts a block diagram of an exemplary embodiment of a system of the present invention.

Referring now to FIG. 1, an exemplary embodiment 100 of a block diagram representing a system for installing a custom software configuration on a build to order computer system is shown. A system apparatus 110 may utilize a database 120 that may include two separate tables. A component table 130 may be maintained by the database 120 and may include all possible components that are utilized within the systems being manufactured. A step table 140 may also be maintained by the database 120 and may include install/test steps shared among different components of all the systems being manufactured. The step table 140 may also be linked with the system apparatus 110 to allow the apparatus 110 to perform the appropriate install/test step associated with a specific component.

Figure 2:
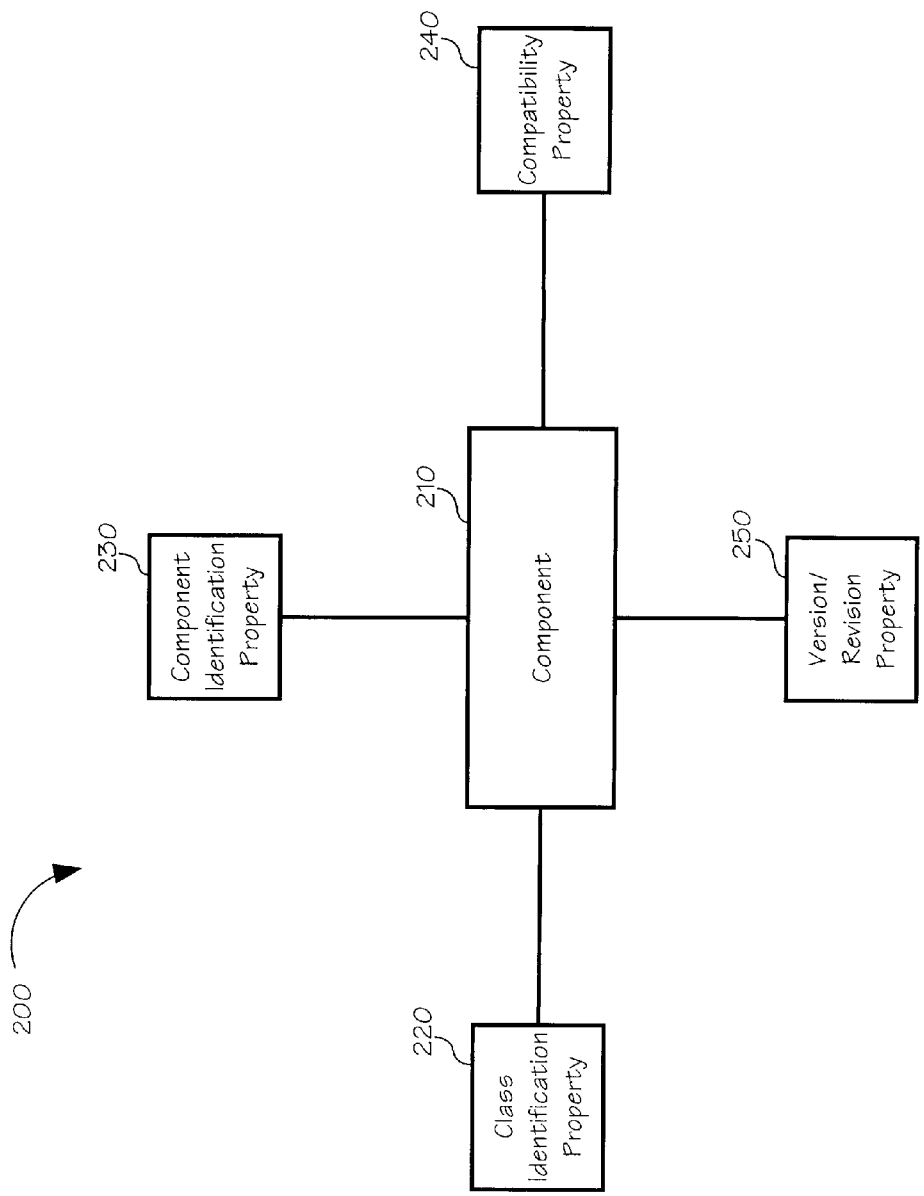
FIG. 2 depicts exemplary properties that may be included within each component listed in a component list.

Referring now to FIG. 2, an exemplary embodiment 200 of a component 210 listed in a component table of the present invention is shown. Each component included within the computer systems being manufactured may be listed in the component table maintained by a database of the present invention. Each component includes several properties defining the component. For example, in an exemplary embodiment each component may be identified by a class identification property 220, a component identification property 230, a compatibility property 240, and a version/revision property 250. The class identification property 220 identifies the class of a component. For example, several types of memory exist, each may be identified as being a member of the memory class. A component identification property 230 may identify the specific component type to the database.

A compatibility property 240 may be included to signal any potential compatibility conflicts between the components. The version/revision property 250 may be included to signal the version/revision number of a component. For example, some versions of components may have different operating requirements than others, also some versions of components may have compatibility conflicts with other components where later versions of a component may not have compatibility conflicts.

Figure 3:
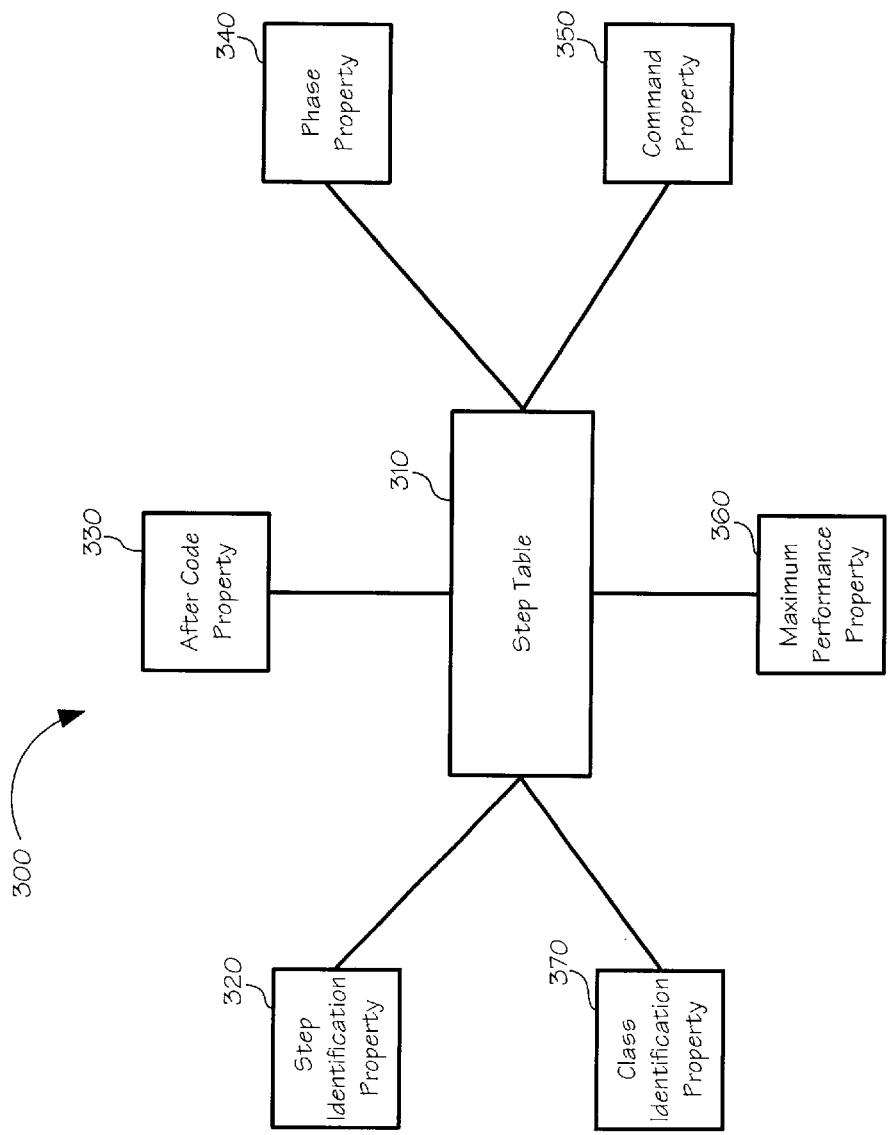
FIG. 3 depicts exemplary properties that may be included within each step listed in a step list.

Referring to FIG. 3, an exemplary embodiment 300 of the properties included within a step table 310 of the present invention is shown. The step table may include a step identification property 320, an after code property 330, a phase property 340, a command property 350, a maximum performance property 360, and a class identification property 370. The step identification property 320 may provide a unique identification for each software installation or testing step. The after code property 330 may identify whether a halt or reboot may be required after a corresponding step has been executed.

The phase property 340 may designate a phase of manufacture a step is to be executed where a command property 350 may conform to an executable command line for performing a software installation step. A maximum performance property 360 may indicate the maximum number of times that a corresponding step runs. A class identification property 370 identifies a class of components which is associated with a software installation or testing step.

Turning to a more detailed description of the compatibility property, the compatibility property defines known compatibility issues between components. When testing and installation steps identify unknown compatibility issues, the errors may be logged and the compatibility property for the specific conflicting components may be automatically updated for future reference. When a software or hardware component is upgraded to a new version or revision, targeted testing of the new version or revision may occur to determine if known compatibility issues for earlier revisions are still present. Through the utilization of the version/revision property, several versions of a component may be maintained within the component table. Installation may be programmed to use the latest version or revision of a component that does not have known compatibility conflicts based on each custom component configuration.

Figure 4:
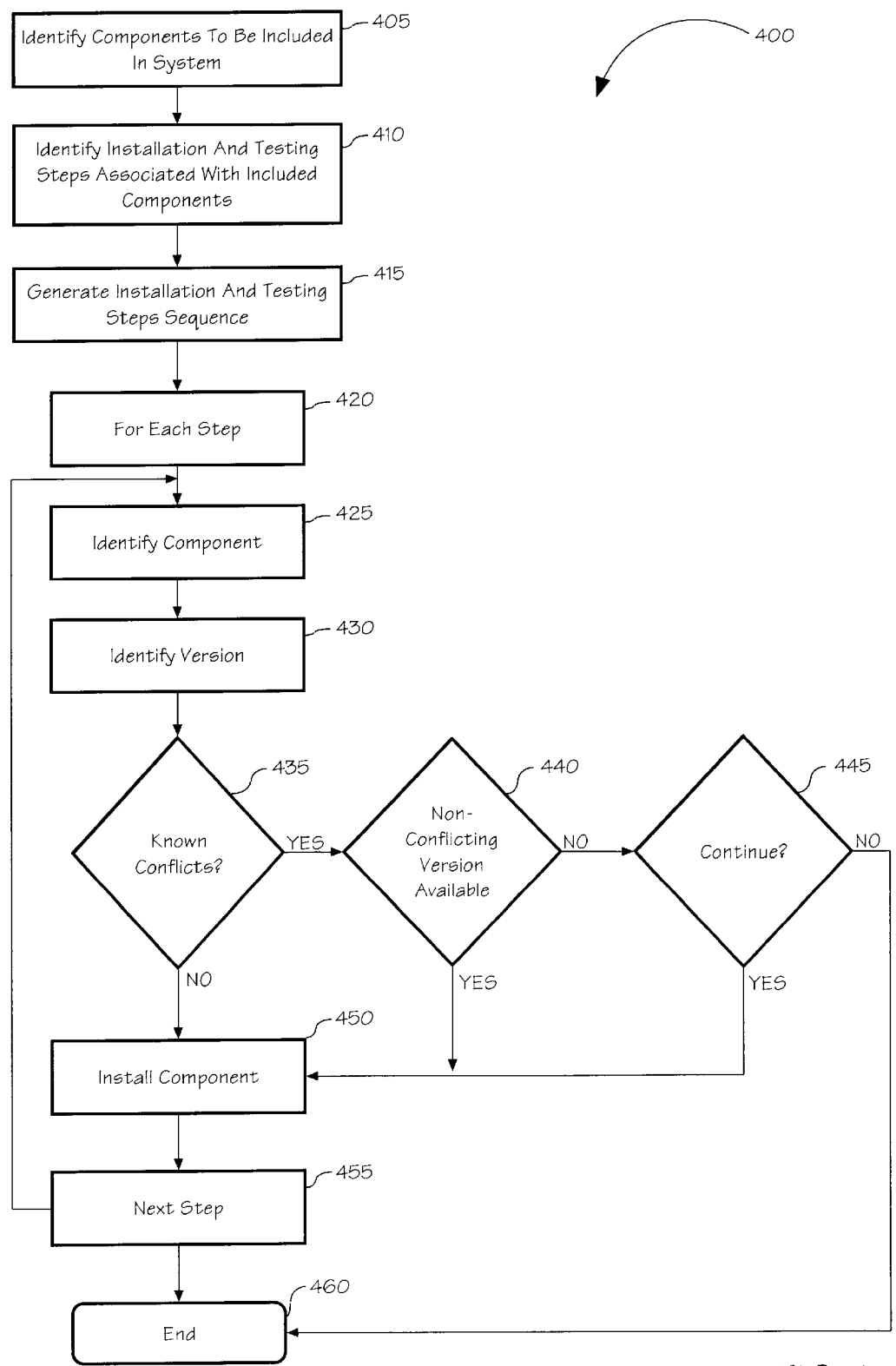
FIG. 4 is a flow diagram representing an exemplary embodiment of a process performed by the system of the present invention.

Referring to FIG. 4, a flow chart representing an exemplary process 400 of manufacturing a build to order computer system with component compatibility verification of the present invention is shown. When an order for a custom computer system is received, the components that are to be included in the system are identified 405. After identifying the components that may be required in the system, the installation and testing steps associated with the included components are identified 410. The next step may be to generate an installation and testing steps sequence 415.

At this time, each installation and testing step 420 may be analyzed to determine the identity of the component 425 and the version/revision number 430. The apparatus of the present invention checks if there are any known conflicts present in the component involved in the associated step 435. If there are no compatibility issues with regard to the component, then the component is installed 450 and the process moves to the next step 455. If all the testing and installation steps have been completed, then the process is complete 460.

If the component has a compatibility conflict, then the apparatus of the present invention checks if any non-conflicting versions/revisions of the component are available 440. In a preferred embodiment, the apparatus may utilize the latest version/revision of the component that does not have compatibility conflicts. If another version/revision of the component is available that does not have a compatibility conflict, then that particular version/revision of the component may be installed.

If the component has a compatibility conflict and non-conflicting versions/revisions of the component are not available, then the process may make a determination to continue 445. If its possible to build the build to order custom component configuration with the known conflict, yet allow the system to work properly then the component may be installed and the process is continued. However, if the build to order system does not work properly as a result of the compatibility conflict of the component, then the process may be terminated.

Other embodiments may be utilized in order to generate a build to order custom component configuration by one of ordinary skill in the art without departing from the scope and spirit of the present invention. For example, in an alternative embodiment the conflict identification steps earlier in the process at a time when the install sequence is generated.

Although the invention has been described with a certain degree of particularity, it should be recognized that elements thereof may be altered by persons skilled in the art without departing from the spirit and scope of the invention. It is believed that the method and apparatus for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system for generating a custom component configuration for a computer, comprising:

(a) a component library, said component library including a set of components utilized in manufacturing a computer, said component library including a compatibility property and a revision property for a member of said set of components; and a step library, said step library including a set of installation and testing instructions suitable for generating a custom component configuration for said computer, wherein said system is capable of analyzing a desired custom component configuration and selecting at least one component necessary for manufacturing said desired custom component configuration from said set of components, said at least one component being the latest revision that does not have a compatibility conflict with an additional component in said custom component configuration by analyzing said compatibility property and said revision property of said at least one component and said additional component, wherein said compatibility property of said component library is updated when compatibility conflicts are identified.

2. The system as claimed in claim 1, wherein said component library and said step library are included within a database.

3. The system as claimed in claim 1, wherein said revision property signals at least one of version and revision of said member of said set of components.

4. The system as claimed in claim 1, wherein said compatibility property identifies whether said member of said set of components has a compatibility conflict with said additional component.

5. The system as claimed in claim 1, wherein a new revision of said member of said set of components is automatically tested for conflicts present in earlier revisions of said component.

6. The system as claimed in claim 1, wherein said at least one component is not installed when all revisions of said at least one component have a compatibility conflict with said additional component in said custom component configuration.

7. The system as claimed in claim 1, wherein said system is capable of selecting a similar component when said at least one component has a compatibility conflict with said additional component in said custom component configuration.

8. A computer implemented method of generating a custom component configuration for a computer, comprising:

(a) analyzing a custom component configuration as selected by a customer;

(b) identifying at least one component necessary to generate said custom component configuration to be included within said computer, said at least one component having a compatibility property and a revision property;

(c) identifying installation and testing steps associated with said at least one component;

(d) selecting the latest revision of said at least one component that does not have a compatibility conflict with an additional component to be included within said custom component configuration by analyzing said compatibility property and said revision property of said at least one component;

(e) installing said at least one component when said at least one component does not have a compatibility conflict with said additional component, and (f) updating said compatibility property of said at least one component when additional compatibility conflicts are identified.

9. The method as claimed in claim 8, wherein said revision property signals at least one of version and revision of said at least one component.

10. The method as claimed in claim 8, wherein said compatibility property identifies whether said at least one component has a compatibility conflict with said additional component.

11. The method as claimed in claim 8, further comprising the step of automatically testing for compatibility conflicts present in earlier revisions of said at least one component when a new revision of said at least one component is available.

12. The method as claimed in claim 8, further comprising the step of selecting a similar component when said at least one component has a compatibility conflict with said additional component in said custom component configuration.

13. A system for generating a custom component configuration for a computer, comprising:

(a) means for organizing a list of components available for use in manufacturing a computer;

(b) means for organizing a list of steps, said list of steps including a set of installation and testing instructions suitable for generating a custom component configuration for said computer; and (c) means for selecting a component for installation of said custom component configuration; said selecting means including:

a compatibility property associated with said component; and a revision property associated with said component; wherein a component is selected by analyzing said means for organizing a list of components to find a compatible component to install into said computer system, said component being the latest revision of said component that does not have a compatibility conflict with an additional component in said custom component configuration, said compatibility property being updated when additional compatibility conflicts are identified.

14. The system as claimed in claim 13, wherein said means for organizing a list of components and said means for organizing a list of steps are included within a database.

15. The system as claimed in claim 13, wherein said revision property signals at least one of version and revision of said component.

16. The system as claimed in claim 13, wherein said compatibility property identifies whether said component has a compatibility conflict with said additional component.

17. The system as claimed in claim 13, wherein a new revision of said component is automatically tested for conflicts present in earlier revisions of said component.

18. The system as claimed in claim 13, wherein said component is not installed when all revisions of said component have a compatibility conflict with said additional component in said custom component configuration.

19. The system as claimed in claim 13, wherein said system is capable of selecting a similar component when said component has a compatibility conflict with said additional component in said custom component configuration.

* * * * *